United States Patent [19]

Morrill, Jr. et al.

[11] Patent Number: 5,040,284

[45] **Date of Patent: * Aug. 20, 1991**

[54] METHOD OF MAKING A SUB-MINIATURE ELECTRICAL COMPONENT, PARTICULARLY A FUSE

[75] Inventors: Vaughan Morrill, Jr.; John H. Scandrett, both of St. Louis County, Mo.; David K. Hudson, Madison County, Ill.

[73] Assignee: Morrill Glasstek, Maryland Heights, Mo.

[ * ] Notice: The portion of the term of this patent subsequent to Aug. 29, 2006 has been disclaimed.

[21] Appl. No.: 552,000

[22] Filed: Jul. 12, 1990

Related U.S. Application Data

[62] Division of Ser. No. 491,232, Mar. 9, 1990, Pat. No. 5,001,451, which is a division of Ser. No. 396,561, Aug. 21, 1989, Pat. No. 4,926,543, which is a division of Ser. No. 198,762, May 25, 1988, Pat. No. 4,860,437, which is a division of Ser. No. 5,964, Jan. 22, 1987, Pat. No. 4,749,980.

[51] Int. Cl.[5] ........................ H01S 4/00; H01H 69/02

[52] U.S. Cl. .................................... 29/592.1; 29/411; 29/455.1; 29/623; 204/192.15

[58] Field of Search ...................... 204/192.15, 192.17; 29/623, 412, 414, 411, 455.1, 610.1, 592.1; 337/227, 228, 232, 297

[56] References Cited

U.S. PATENT DOCUMENTS

| | | | |
|---|---|---|---|
| 2,864,917 | 12/1958 | Sundt . | |
| 3,314,873 | 4/1967 | Lunsford | 204/192.15 |
| 3,358,362 | 12/1967 | McElroy . | |
| 3,401,452 | 9/1968 | Ragan . | |
| 3,500,276 | 3/1970 | Hingorany et al. | 337/183 |
| 3,564,354 | 2/1971 | Aoki . | |
| 3,693,128 | 9/1972 | Jacobs, Jr. . | |
| 3,849,878 | 11/1974 | Rudd et al. | 29/412 |
| 3,887,893 | 6/1975 | Brandt et al. . | |
| 4,016,527 | 4/1977 | Francis et al. . | |
| 4,140,988 | 2/1979 | Oakes . | |
| 4,337,570 | 7/1982 | Woznica . | |
| 4,376,927 | 3/1983 | McGalliard . | |
| 4,433,360 | 2/1984 | Wakino et al. . | |
| 4,460,888 | 7/1984 | Gratton . | |
| 4,486,738 | 12/1984 | Sadlo et al. | 29/412 |
| 4,520,338 | 5/1985 | Watanabe . | |
| 4,532,489 | 7/1985 | Phillips . | |
| 4,536,270 | 8/1985 | Johnson | 204/192.15 |
| 4,540,969 | 9/1985 | Sugar . | |
| 4,540,970 | 9/1985 | Kasamatsu . | |
| 4,720,767 | 1/1988 | Chan et al. | 361/275 |
| 4,749,980 | 6/1988 | Morrill, Jr. et al. . | |
| 4,771,260 | 9/1988 | Gurevich . | |
| 4,860,437 | 8/1989 | Morrill, Jr. et al. . | |
| 4,873,506 | 10/1989 | Gurevich . | |
| 4,926,543 | 5/1990 | Morrill, Jr. et al. . | |

FOREIGN PATENT DOCUMENTS

| | | |
|---|---|---|
| 948894 | 10/1956 | Fed. Rep. of Germany . |
| 3304263 | 8/1984 | Fed. Rep. of Germany . |

*Primary Examiner*—P. W. Echols
*Attorney, Agent, or Firm*—Polster, Polster and Lucchesi

[57] ABSTRACT

A sub-miniature fuse for electrical protection includes an assembly of an outer tube and an inner tube made of insulating material. The inner tube has electrodes and a fusible metal link sputtered onto its outer surface. The assembly of inner and outer tubes is terminated electrically at its ends with axial leads, or with surface mounting pads, or with radial leads.

23 Claims, 2 Drawing Sheets

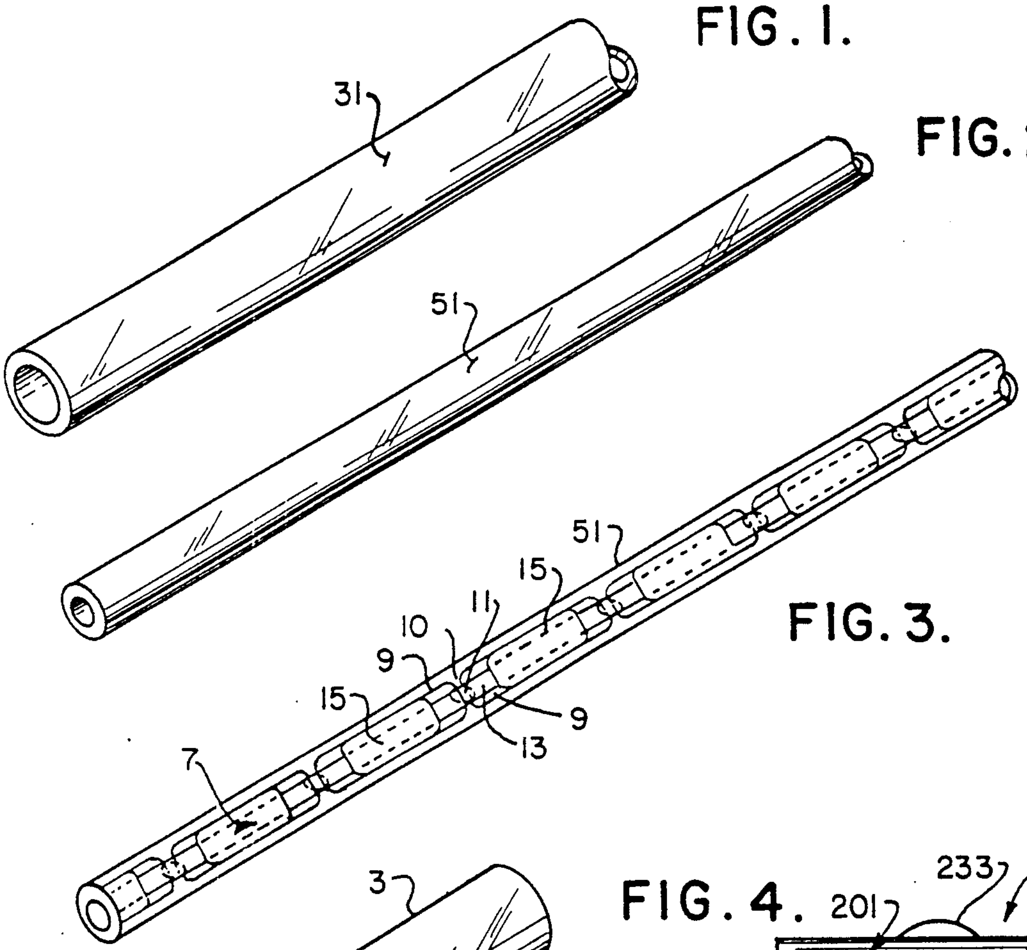
FIG. 1.
FIG. 2.
FIG. 3.
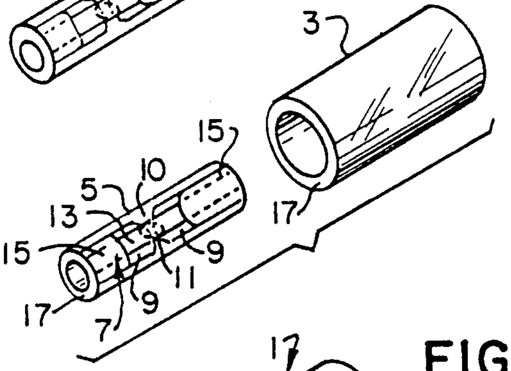
FIG. 4.
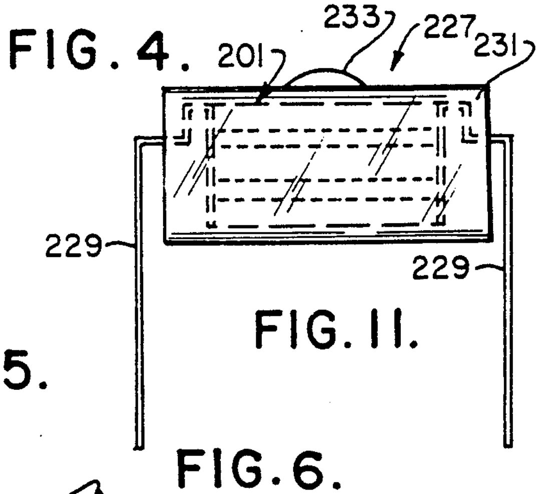
FIG. 11.
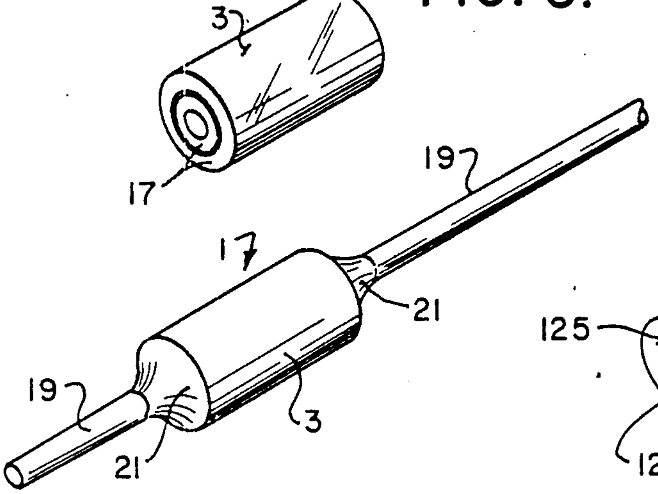
FIG. 5.
FIG. 6.
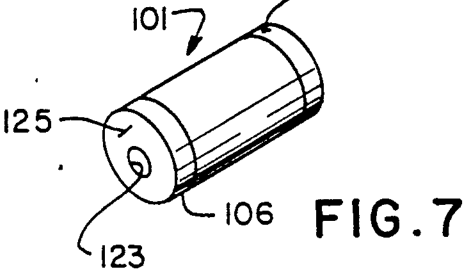
FIG. 7.

METHOD OF MAKING A SUB-MINIATURE ELECTRICAL COMPONENT, PARTICULARLY A FUSE

This is a division of copending application Ser. No. 07/491,232, filed Mar. 9, 1990, now U.S. Pat. No. 5,001,451 which is a division of application Ser. No. 07/396,561, filed Aug. 21, 1989, now U.S. Pat. No. 4,926,543, which is a division of application Ser. No. 198,762, filed May 25, 1988, now U.S. Pat. No. 4,860,437, which is a division of application Ser. No. 005,964, filed Jan. 22, 1987, now U.S. Pat. No. 4,749,980.

BACKGROUND OF THE INVENTION

This invention relates to an improved fuse for electrical circuit protection. It has particular application to an easily manufactured, high precision, high performance sub-miniature fuse of the type which may be used to protect printed circuit boards and components.

The term "sub-miniature fuse" as used herein means a fuse, including its fusible element and its container, having a width of less than one-tenth inch, to allow multiple fuses to be mounted on tenth-inch centers on a printed circuit board Ideally, the fuse has a volume of less than 0.01 cubic inches. It will be understood that the sub-miniature fuse may be mounted in additional external packaging and may include leads extending beyond the dimensions of the fuse body itself.

In the past, sub-miniature fuses have been made by suspending a small fusible wire between the ends of glass or ceramic tubes. Electrical contact is made to the fusible wire by metal end caps which are soldered or mechanically crimped to the fusible element. The whole assembly is held together by crimping the end caps to the glass or ceramic tube.

When axial leads must be affixed to the end caps, for mounting the fuse on a printed circuit board, the fuse body and end caps must be held together with a plastic material to give the assembly enough strength to be handled normally.

The traditional sub-miniature fuse assembly as described has many shortcomings.

The physical dimensions of a fuse to be mounted on a printed circuit board must be as small as possible. When the length of the fusible wire is made short, its diameter must be decreased to maintain the required fuse characteristics. In some cases, the fusible wire must be as small as 0.0003 inches in diameter. Such small wires are extremely hard to assemble into a traditional sub-miniature fuse and cause the cost of manufacturing to be high. As a result, very low current fuses are not practical because of the small size wire required. Moreover, existing sub-miniature fuses are specifically designed for a particular mounting, and are not easily modified for mounting by axial wire leads, surface mounting, or semi-conductor type inline mounting.

The typical sub-miniature fuse using a wire fusible element cannot be controlled to extremely close circuit interrupt characteristics because of variations in fusible wire diameter, composition and free length. Crimping and solder type electrical connections to the fusible wire element are notoriously inaccurate methods for controlling the free wire length.

Furthermore, the traditional construction is not hermetically sealed. Although some other constructions provide a plastic seal, most do not provide the truly hermetic seal which can be provided only by a proper glass-to-metal seal. Therefore, they can neither contain a given gas composition nor protect the interior from external gas and vapor contamination. As a result, the electrical characteristics of the traditional sub-miniature fuse are subject to change with age and environmental conditions.

With the traditional sub-miniature fuse construction, high current and high voltage fuses are not practical. The short length of fusible wire and close proximity of metal end caps causes a very energetic conductive plasma to establish itself inside the fuse body during high voltage and high current fault interruption. The resulting vaporized metal plasma arc heats the interior of the fuse rapidly and generates high internal pressures which cause the device to explode destructively, thereby putting in jeopardy other components on the printed circuit board. Both physical damage and fire hazards can result from such an explosion.

The traditional construction is inherently weak when subjected to axial pull loads because only the encasing plastic holds the end caps and axial leads in place. The external plastic cannot be made heavy enough to support typical loads without increasing the external fuse dimensions beyond reason.

The need to hold traditional sub-miniature fuses together with external plastic coatings makes visible inspection of the interior, to determine whether a fuse has blown, virtually impossible.

SUMMARY OF THE INVENTION

One of the objects of this invention is to provide a fuse, particularly a sub-miniature fuse, which may be made extremely small.

Another object is to provide such a fuse which is easily adapted for surface mounting, attachment by wire leads, or semi-conductor type mounting to a printed circuit board.

Another object is to provide such a fuse which may easily be manufactured to precisely defined normal and overload electrical characteristics, from extremely low currents, on the order of one milliampere, to currents of ten amperes or more.

Another object is to provide such a fuse which is so small that plural fuses may be packaged together and connected electrically in parallel to provide higher amperage ratings or in series to provide higher voltage ratings.

Another object is to provide such a fuse which is mechanically very strong, and whose leads, when provided, are capable of withstanding substantial axial pulls.

Another object is to provide such a fuse which resists physical breakage even under extreme electrical overloads.

Another object is to provide such a fuse which may be hermetically sealed to a very high degree of hermeticity, and which may contain inert gas, or an arc-quenching gas, or a vacuum, in order to maintain predictable operation over long periods and under widely varying environmental conditions.

Another object is to provide such a fuse which can be visually inspected to determine whether it has blown, and which is easily handled for replacement.

Another object is to provide a method of manufacturing such a fuse which is simple and easily automated.

Other objects of this invention will be apparent to those skilled in the art in light of the following description and accompanying drawings.

In accordance with one aspect of this invention, generally stated, a fuse is provided comprising an assembly of an inner and outer tube made of insulating material, with the inner tube having a fusible metal link applied to its outer surface. The assembly of inner and outer tubes is terminated electrically at its ends.

Preferably the inner and outer tubes are both made of an insulating material such as glass or ceramic. Most preferably, the tubes are made of high-temperature glass having a softening point in excess of 700° C. Such a glass can be drawn to extremely close tolerances. Under high voltage, high current conditions, e.g. 250 volts and 50 amps, the high temperature glass does not become sufficiently conductive to sustain an arc. The fuse therefore interrupts without exploding or causing a fire.

Preferably, the fusible link is applied to the inner tube by deposition, most preferably by sputtering techniques adapted from well-known sputter, masking, photolithography and etching techniques used in the semi-conductor industry. As a result, the fine wire problem, as it exists in conventional sub-miniature fuses, is completely eliminated. This new construction allows for much lower current fuses to be made since the wire problem is eliminated.

Preferably, sputter techniques are also utilized to produce electrodes on the outer surface of the inner tube, to produce a strap over the electrodes and fusible link, to produce spacing pads at the ends of the inner tube, and to produce a low resistance electrical connection on the axial ends of the tubes to the sputtered metal electrodes. The sputtered axial connections also provide excellent binding surfaces for electrical contacts for the fuse assembly.

Sputtered metal end terminations can be soldered directly to contacts at the ends of the fuse. The soldering operation preferably provides a hermetic seal between the inner and outer tubes of the fuse and provides extremely strong axial terminations. The contacts at the ends of the tube may be formed in various ways, to provide different types of mountings for the fuse. In one embodiment, a wire is inserted into the inner tube, and solder is applied around the wire, to provide an axial lead. In another embodiment, the ends of the tubes are sealed to each other by a solder ring, and the fuse is surface mounted to the printed circuit board. In other embodiments, radial leads are soldered to the ends of the fuse, and a clear plastic jacket and viewing window are optionally molded around the fuse. In these last embodiments, the fuse may be mounted as a single or dual inline component, or multiple fuses may be molded together in a single or dual inline package configuration. The dual inline package may be formed with the fuse assemblies placed side by side on 0.100" centers, to yield packaging or mounting densities far greater than those presently known.

The present design allows metallization of the inner and outer tube ends, so that electrical and mechanical connections of superior quality can be made to the axial leads. Much higher strength and lower resistance at the end terminations result when compared with the traditional sub-miniature fuse construction.

This invention allows a very close fit to be developed between the inner and outer insulating tubes, leaving a small space between the tubes, so that during fault interruption extremely high pressures are developed. These pressures, that result from an interrupt arc, are high enough to extinguish the arc before it can cause a destructive explosion to occur. The $I^2T$ energy product of the sputtered fusible link, when extinguished by high pressure gases, is at least five times less than the conventional sub-miniature wire type fuse.

It has been found that many of the advantages of the present fuse require that the cross-sectional area of the space between the tubes be less than 0.001 square inches. The cross section is taken perpendicularly to the conductor. In the preferred fuses, this corresponds to a difference in diameter of 0.008 inches (200 microns) or spacing of less than 0.004 inches if the inner tube is centered in the outer tube. Preferably, the cross-sectional area is less than 0.0001 square inches, and the spacing is between 0.001 inch and 0.002 inch around.

The close spacing between the tubes is important not only for quenching the arc, but also in the manufacture of the fuse. The close spacing prevents sputtering into the space between the tubes or capillary draw of solder into the space between the tubes. It also facilitates sealing the ends of the fuse.

The present invention also provides a method for controlling, much more closely than possible with conventional designs, the composition and dimensions of the conductor deposited on the inner tube, including particularly the fusible link and electrodes. The compositions of the conductor elements may be controlled by choosing targets of desired composition in the sputtering operation. Preferably, the link is formed by successively sputtering layers of different metals of predetermined thickness. In the preferred embodiment the layers are tin and copper having thicknesses of a few microns, but conductive materials having thicknesses as low as a few angstroms may be used to form alloys or quasi-alloys. By controlling the composition and dimensions of the conductor, the present invention controls the characteristics of the fuse both during normal operation and under current and voltage overload conditions.

Other aspects of this invention will become more apparent in light of the following description.

BRIEF DESCRIPTION OF THE DRAWINGS

FIG. 1 is an isometric view of an outer hollow tube utilized in producing fuses of the present invention.

FIG. 2 is an isometric view of an inner hollow tube utilized in producing fuses of the present invention.

FIG. 3 is an isometric view of the inner hollow tube of FIG. 2, with electrodes, fusible links, straps, and spacing pads sputtered onto its outer surface.

FIG. 4 is an isometric view of a portion of the outer hollow tube of FIG. 1 and a portion of the inner hollow tube of FIG. 2, cut to form a disassembled single fuse of the present invention.

FIG. 5 is an isometric view of the assembled fuse of FIG. 4.

FIG. 6 is an isometric view of the assembled fuse of FIG. 5, with axial leads attached.

FIG. 7 is an isometric view of the assembled fuse of FIG. 5, ready for surface mount.

FIG. 11 is a view in side elevation of the assembled fuse of FIG. 5, with radial leads attached to its axial ends and with a plastic coating and lens applied over the fuse.

DESCRIPTION OF THE PREFERRED EMBODIMENT

Figure 8:
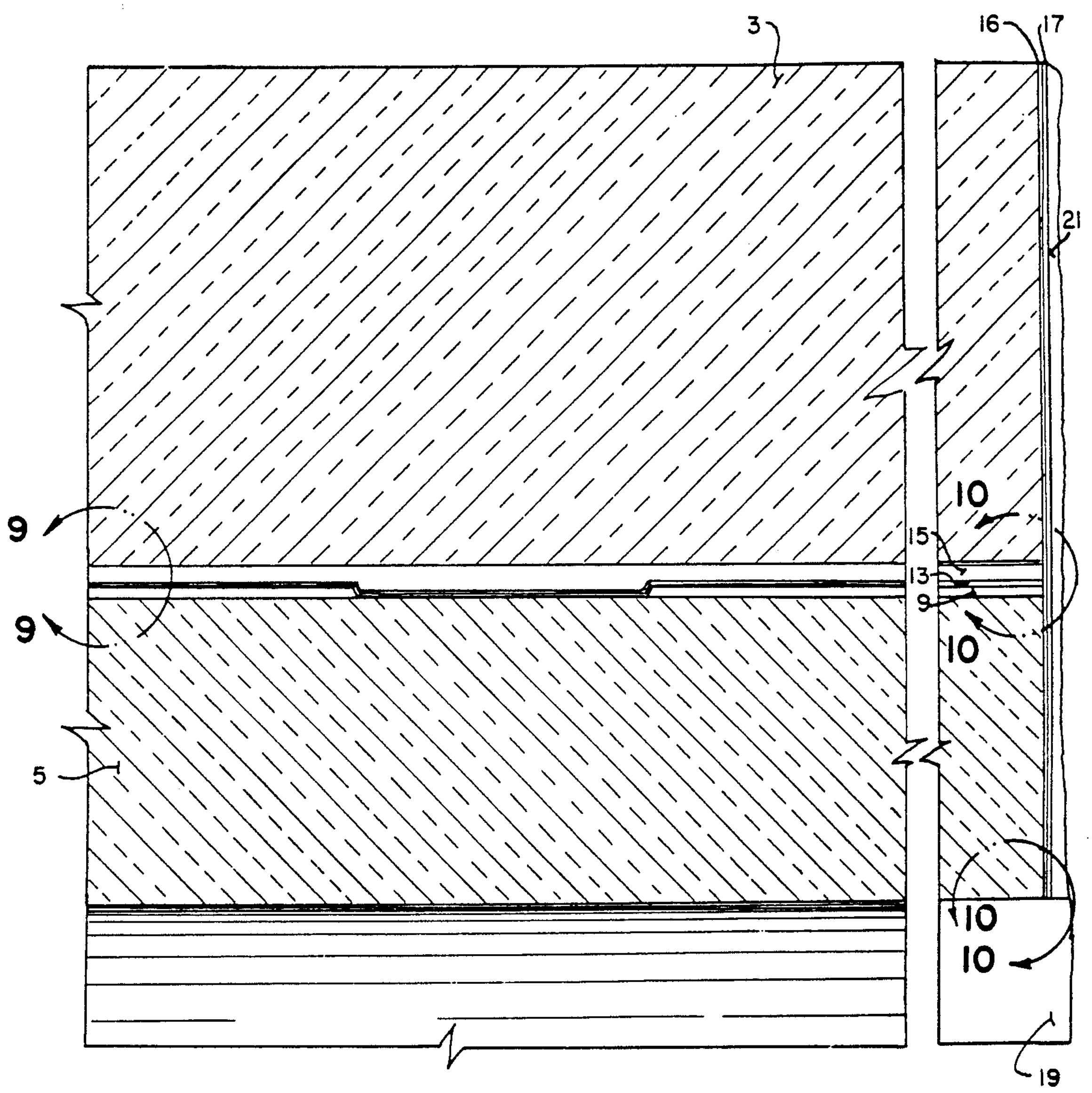
FIG. 8 is an enlarged view in cross section through a fusible link area and an axial end area of the fuse of FIG. 5.
Figure 9:
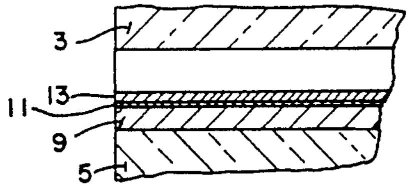
FIG. 9 is an enlarged view taken along the line 9—9 of FIG. 8.

Referring now to the drawings, and in particular to FIGS. 4, 5 and 8–10, reference numeral 1 indicates one illustrative embodiment of fuse of the present invention. The fuse 1 is formed from an outer tube 3 (FIG. 4) and an inner tube 5 (FIG. 4). The outer tube 3 and inner tube 5 are both formed from high temperature KG-33 borosilicate glass having a softening point of 820° C. The outer tube 3 has an inner bore diameter of 0.0515" and outer diameter of 0.090" and a length of 0.286". The inner tube 5 has an outer diameter of 0.0495" and an inner bore diameter of 0.026" and a length of 0.286".

The inner tube 5 has metal film conductors 7 applied to its outer surface. The conductors 7 are applied by masking and vacuum sputtering as described hereinafter.

As shown in FIGS. 4 and 8–10, the conductors 7 include two copper electrodes 9 extending to the ends of the inner tube 5 and separated by a narrow gap 10, a fusible tin link 11, a copper strap 13, and two copper pads 15. The rating, the electrical characteristics, and the thermal characteristics of the fuse are easily varied by varying the materials and the geometries of the electrodes 9, link 11, and strap 13. The following illustration is of a typical fuse having a rating of 5.5 amp and 250 volts. In particular, the rating of the fuse may be changed by changing the geometries and compositions of the electrodes 9, the gap 10, the link 11, the strap 13, and the pads 15.

The electrodes 9 extend inward from each axial end of the inner tube 5 a distance of 0.137". The electrodes 9 are 0.040" wide by 12 microns thick. A non-conductive gap 10 is left between the two electrodes 9. The gap 10 is 0.012" wide.

The fusible link 11 is a round tin spot, 0.035" in diameter and 1.1 micron thick bridging the 0.012" gap in the copper electrodes 9.

The conductive copper strap 13 covers the center portion of tin spot 11 and runs from end to end of the inner tube 5. The copper strap is 0.030" wide and 2.2 microns thick. The strap assures an excellent electrical connection between the link 11 and the electrodes 9. It also provides an effective alloy with the tin spot during voltage and current overloads of the fuse 1, thereby controlling the temperature at which the fuse blows, as described in more detail hereinafter.

The copper pads 15 are 0.044" long, extending to the ends of the inner tube 5. The pads are 0.030" wide by 10 microns thick. The pads 15 ensure that the link 11 is spaced from the outer tube 3.

To the axial ends of the inner tube 5 and outer tube 3 are applied copper layers 17 in electrical contact with the spacers 15, strap 13, link 11 and electrodes 9. The axial end layers 17 do not extend substantially into the space between the tubes 3 and 5 or along the outer surface of the outer tube 3.

As shown in FIGS. 6 and 8–10, in one preferred embodiment of the invention, wire leads 19 extend into the inner tube 5, and solder 21 connects the leads 19 and metallized ends 17 of the tubes. Each wire lead 19 is 0.025" in diameter and is 1.5" long and extends 0.060" into the inner tube 5. The solder 21 is preferably a high temperature solder, for example a commercially available solder made of 95% lead and 5% tin, having a solidus point of 310° C. and a liquidus point of 314° C. Such a solder is particularly well adapted to a modified form of the fuse 1, shown in FIG. 7 and described more fully hereinafter, which is surface mounted to a printed circuit board. The solder 21 applied to the metallized ends of fuse 1 covers the annular space between tube 3 and 5 as well as the faces 17, providing an excellent electrical connection between the leads 19, faces 17, electrodes 9, strap 13, and pads 15. The solder 21 also forms a glass-to-metal hermetic seal enclosing the volume between the outer tube 3 and inner tube 5. The solder 21 is sufficiently malleable to accommodate thermal stresses on itself and the glass tubes 3 and 5 under a wide range of thermal conditions.

The fuse 1 may be produced using vacuum sputtering to metallize the conductors on the fuse. A variety of sputtering techniques may be used, including DC sputtering, radio frequency sputtering, triode sputtering, and magnetron sputtering, in accordance with standard procedures in the sputtering art. An example of a method found to be effective in producing the preferred fuse is as follows.

Twenty fuses 1 are produced from two lengths of high precision KG-33 borosilicate glass tubing: a larger diameter length 31, shown in FIG. 1, having an outer diameter of 0.090" and an inner bore diameter of 0.0515", for the outer tubes 3, and a smaller diameter length 51, shown in FIG. 2, having an outer diameter of 0.0495" and an inner bore diameter of 0.026", for the inner tubes 5.

As shown in FIG. 3, the smaller diameter tubing 51 is metallized by sputtering conductors 7 onto it in separate operations.

The smaller diameter tubing 51 is cleaned and placed in a vacuum sputtering machine, using a fill of argon gas at a pressure of about ten millitorrs, with a mechanical mask covering all of the tubing 51 except the portions desired to be metallized.

In the first step, the mask exposes strips 0.040" wide by 0.288" long for the electrodes 9. The strips are separated by a 0.012" wide bridge in the mask, to provide the gap 10 between the electrodes 9 of each fuse 1. In accordance with known procedures, a radio frequency sputter etching step is carried out, to remove a few molecules of glass from the surface to be metallized. The masked glass is then exposed to a copper target by DC magnetron sputtering for a sufficient time to permit twelve microns of copper to be drawn from the target and deposited on the tubing 51 to form the electrodes 9. The sputtering process provides a tightly bonded coating of copper on the glass tubing 51.

In the second step, the tubing 51 is withdrawn from the sputtering machine, and a second mask replaces the first mask over the tubing 51. The second mask covers the tubing 51 except for 0.035" diameter round spots spaced 0.300" apart along the tubing 51. The spots are centered over the gaps 10 between electrodes 9. The tubing 51 is returned to the sputtering machine, and a lower melting material, tin, is used as the target. A radio frequency sputtering process produces a spot of tin 1.1 microns thick over the gap 10 and extending up and across the electrodes 9 on both sides of the gap 10.

The next fabrication step is the use of a third mask to produce copper strap 13. The opening in the mask is 0.030" wide and extends the length of the mask. The masked tubing 51 is placed in the sputtering machine, and a copper strap 13 having a thickness of 2.2 microns is deposited by DC magnetron sputtering. The strap 13 bridges the gap 10 and covers the tin spot 11 and electrodes 9 as shown in FIG. 3.

The final metallization step on the length 51 is the use of a fourth mask and DC magnetron sputtering to produce copper pads 15 of a controlled thickness to hold the fusible center portion deposited on the outside of tube 5 away from the inside of tube 3 as shown in FIG. 8. The fourth mask has openings which are 0.030 inches wide and 0.100" long, centered between the gaps 10. The masked tubing 51 is placed in the sputtering machine, and a layer of copper 10 microns thick is sputtered onto the tubing 51.

Figure 10:
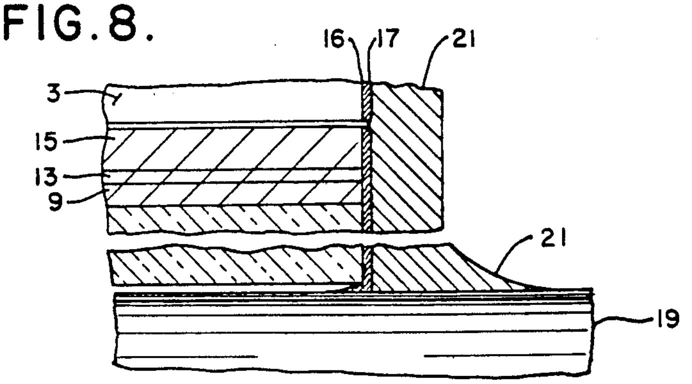
FIG. 10 is an enlarged view taken along the lines 10—10 of FIG. 8.

As shown in FIG. 10, the process of sputter etching, followed by sputtering, lays down layers of copper which become indistinguishable. Therefore, although separate layers are indicated in FIG. 10, representing the different steps in depositing the layers, a cut through the pad sections 15 of a finished fuse would show a single layer of copper rather than an electrode layer, a strap layer, and a pad layer.

In practice, several tubing lengths 51 are metallized simultaneously. The metallized inner tubing lengths are inserted into the outer tubing length 31 to form assemblies. The assemblies are held in a wax matrix, with rods inserted in the hollow inner tubes 51. The assemblies are diamond sawed with a 0.14" blade to length as shown in FIG. 5. The sawed assemblies are then placed in a fixture, dewaxed, and cleaned. The fixtured assemblies are masked on their outer surfaces by the fixture, leaving one of the sawed axial end faces of the inner and outer tubes exposed. The inner surfaces of the inner tubes 5 are masked by the rod segments. The fixtures and assemblies are then placed in the vacuum sputter deposition machine to deposit, by DC magnetron sputtering, 500 angstroms of nickel vanadium 16 then 1.5 microns of copper 17 on one cut axial end of the tubes 3 and 5, as best shown in FIG. 10. The nickel vanadium is a 7% vanadium alloy, The fixtured assemblies with one end metallized are removed from the sputter machine, turned around, and reinserted in the sputter machine, and the other ends of the sawed assemblies are provided with the same nickel vanadium layer 16 and copper layer 17. The layers 16 and 17 cover the axial ends of the tubes 3 and 5, bonding with the axial ends of the conductors 7 to form a continuous physical and electrical layer, but they do not extend more than a few microns, at most, into the space between the tubes 3 and 5, or onto the outer face of the outer tube 3, or into the inner bore of the inner tube 5. The small clearance between the inner tube 5 and outer tube 3 prevents any measurable or observable deposit of metal on the outer surface of the inner tube 5 or the inner surface of the outer tube 3 during metallization of their ends.

FIG. 4 is an exploded view showing a piece of hollow outer tube 3 for sleeving to a piece of hollow inner tube 5 with equal length. Inner tube 5 has on its outer surface electrode deposits 9 separated by a gap 10, fusible spot 11 bridging the gap 10, strap deposit 13 running from end to end of the inner tube 5, and pads 15, which together make up the conductor 7. The ends of the inner tube 5 and outer tube 3 have also been metallized with nickel vanadium layer 16 and copper layer 17.

With metallization of the glass tube ends complete the assembly shown in FIG. 5 is placed in an inert gas glove box having an argon atmosphere. Axial copper leads 19 with 0.025" diameter are inserted 0.060" into the bore of tube 5 and held in position during the final solder operation.

Soldering is accomplished without flux by heating the fuse ends and axial copper leads with a typical hot gas resistance heated torch and applying solder. The solder is applied as a 0.010" thick ring having an inner diameter of 0.030" and an outer diameter of 0.080". During soldering the ring thins to about 0.001" in thickness at the outer edge of tube 3. The solder covers the entire axial ends of the fuse 1, forming a hermetic seal between the inner tube 5 and outer tube 3, but it does not extend appreciably into the space between the tubes 3 and 5, or onto the outer face of the outer tube 3, or into the inner bore of the inner tube 5. The torch gas is a mixture of 80% argon and 20% hydrogen gas to reduce any oxides that might have formed on the metal surfaces prior to the soldering operation.

The resulting fuse made by this process is about 0.300" long by 0.090" outside diameter with 1.5 inch by 0.025" diameter copper leads on each end. The fuse has an operating resistance of about 15 or 16 milliohms. The fuse has a rating of 5.5 amps and is able to interrupt 250 volts AC at 50 amps on power factor of 0.9 random closing and 250 volts DC 300 amps (Battery source) without exploding or causing a fire. The $I^2T$ energy during interrupt is much less than the typical wire subminiature fuse, on the order of one-fifth or less of the $I^2T$ energy of the typical wire fuse.

The strength of axial pull is at least 10 lbs., some 50% to 100% better than the typical wire and endcap subminiature construction.

The ability to interrupt such a high voltage and high current comes from the very small volume defined by the outside of the inner tube and the inside of the outer tube.

During the arc conditions at high voltage and high current short circuit, the temperature also rises rapidly between the outside of the inner glass and the inside of the outer glass in the fusible link area. The glass itself can be conductive at these high temperatures so that it is necessary to use a high temperature material such as a hard borosilicate glass or aluminosilicate glass, ceramic or pure silica glass. These materials do not become sufficiently conductive under the conditions of even a high voltage and high current short circuit to support an arc in the fuse of the present invention. It is believed that their ability to withstand such conditions without destruction of the fuse is due at least in part to their having low electrical conductivity at temperatures near their melting points.

The thermal shock, caused by the internal high voltage and high current arc at short circuit, burns back the conductor and disturbs the outer surface of the inner tube and the inner surface of the outer tube in such a way that the result is easily visible from outside the transparent fuse.

A further advantage of this fuse design is the ability to hold any desired gas in the enclosed hermetically sealed volume at any particular pressure between the outer surface of the inner glass, the inner surface of the outer glass and the sealed ends. Such a gas as sulfur hexafluoride is well known for its ability to squelch arc formation and can further reduce the $I^2T$ energy product by incorporation in the aforementioned example.

The hermetic seal has the further advantage of reducing aging of the fuse and reducing its sensitivity to moisture or conductive materials in the atmosphere to which it is subjected The hermetic seal is not, however, required for quenching the arc during fuse blow. It has been found that the internal pressure rise is sufficient to quench the arc even when the ends of the fuse are not sealed.

The clearance between the outer surface of the inner glass, the inner surface of the outer glass and metallized fusible conductors is also critical in the preferred manufacturing process. A clearance of more than approximately 0.001" between the metal fusible link conductors and the inside of the outer glass surface will allow molten solder to wet onto the conductor surfaces inside the fuse. If such wetting of solder onto the inner conductors and fusible link is allowed, the electrical characteristics of the fuse can be severely affected.

The conjoining of the two disciplines of low internal volume and close clearance, makes this invention unique and superior to all previous fuse constructs.

The pads 15, as shown in FIG. 8, hold the inside of the outer glass 3 away from the outside of the inner glass 5 so that a metallic conductive bridge from electrodes 9 will not form on the inside of outer glass 3 at the time of normal fuse blow. If the inside of outer glass 3 is in direct physical contact with the outside of inner glass 5 in the electrodes 9 and spot 11 zone a metallic bridge can form on the inside of tube 1 after normal fuse blow and this bridge can be somewhat conductive causing the fuse to have some residual current carrying capacity which could damage sensitive semi-conductors that the fuse is designed to protect.

A further advantage of the pads 15 is to prevent any thermal coupling to the inside of tube 1 in the electrode 9 link 11 area.. Such thermal coupling can give variable fuse interrupt characteristics and must be avoided so that uniform interrupt characteristics are possible.

Numerous variations in the fuse of the present invention, within the scope of the appended claims, will occur to those skilled in the art in light of the foregoing description.

Merely by way of example, the inner and outer tubes of the fuse may be formed of different high temperature insulating materials, such as aluminosilicate glass, quartz, or ceramic, although the preferred borosilicate glass has the advantage of being easily drawn to extremely close tolerances, while having a sufficiently high softening point to be substantially non-conductive during short circuit interrupt of the fuse. The bore of the inner tube 5 is not only useful as a fixture for leads 19 but also facilitates manufacturing the tube to high precision, so as to ensure the close fit between the tube 5 and the outer tube 3. The bore in inner tube 5, however, does not affect the performance of the fuse. It will therefore be understood that the term "tube", as applied to the inner tube 5, may include a rod.

When a fuse with overall length dimensions of 0.286", as set forth in the preferred embodiment, is cut to overall dimensions of 0.186", the disturbed glass area (and conductor burn-back) changes from a length of 0.150" to 0.075" after high voltage and high current interruption occurs. The volume of enclosed gas changed from approximately 0.00003 $in^3$ to 0.00002 $in^3$ and as a result, the internal pressure rises more rapidly and the $I^2T$ energy is reduced. Reducing the length of the fuse described in this invention, allows for higher current ratings, without changing any other physical dimensions of the fuse. This further contributes to miniaturization and the economic value of such a fuse.

The amperage rating of the fuse may be chosen merely by changing the size and thickness of the fusible element 11 and the strap 13, or by changing the size of the gap 10. By adjusting the relative thickness of tin link 11 and copper strap 13 in the bridge area 10, the melting point can be changed from 232° C. to 1084° C. thereby giving control over the temperature at which the fuse will open when using these two metals. The operating and opening characteristics of the fusible portion may be further controlled by reducing the thickness of each layer down to a few angstroms, with more layers provided, to form an alloy link during normal operation as well as during overload interruption. Ideally, the thickness of each fusible link portion should approximate its width.

The fusible link can be a single metal such as copper with one or more notches to produce a fusible link of smaller cross-sectional area than the electrodes 9, a single low melting metal or alloy bridging the electrode gap or two or more metals bridging the gap as given in the examples heretofore.

Many other single or multiple combinations of elements can be used for the fusible portion to give other melting points to meet special requirements.

The glass-to-metal seal may be formed with lead-free solder or by other means.

The mounting of the fuse may be easily changed. For example, the axial wire leads can have a pre-soldered end like a nail head and may be flush soldered directly to the metallized fuse end surface by reflow of the solder.

Instead of axial leads, the fuse may also be mounted on a printed circuit board by surface mounting or by means of integrated circuit type lead configurations.

FIG. 7 shows a finished fuse assembly 101 made without axial leads and ready for surface mount on a printed circuit board. The axial ends of the fuse have been sealed, except for inner tube bore 123, by inert gas soldering of solder rings 125. This modification is produced in the same way as the previous embodiment except that the ends of the outer surface of the outer tube have been metallized to form band areas 106, and a lower melting point solder extends onto the band areas 106. The solder in the band areas 106 reflows onto the printed circuit board pads during normal surface mount procedures.

FIG. 11 shows a finished fuse assembly 227 in which a fuse 201, corresponding to the fuse 1 of FIG. 5 of the first embodiment, has been configured as a single fuse in a dual inline package. Leads 229 are attached to the metallized ends of the fuse 201 by soldering. The entire leaded fuse is then encased in a plastic package 231 having a lens 233 for viewing the condition of the fuse. If the fuse assembly is mounted in a socket on the printed circuit board, it may easily be removed and changed after it has blown. It will be seen that the extremely small size of the fuse 201 permits several fuses to be mounted in a single package, particularly in a dual inline package. This type of mounting permits either separate fuses for different circuits on a single board or multiple fuses connected in parallel to provide higher amperage ratings for a single circuit or connected in series for higher voltage ratings. Higher voltage ratings may also be obtained simply by cutting longer lengths of tubing 31 and 51, to include several links 11.

The method of making the fuse of the present invention may also be modified. Although sputter deposition of the conductors has great advantages, other metallization methods may also be used.

The sputter process may also be modified. The layers may be laid down in different order. For example, the tin link may be laid down first. A common practice in sputtering metals onto glass, is to use a reactive first layer of titanium, nickel vanadium or others, to act as a bond between the glass and first main metallic layer. The reactive metal is usually very thin, on the order of 500 angstroms, and can produce not only a better bond but may also decrease the sputter etch cleaning time in the sputter equipment. For this reason and others, the reactive metallic alloy, nickel vanadium, is used to make the glass to metal seals on the ends of the fuse body. For similar reasons, thin reactive sputtered metal layers can be used between the glass and conductors 7 when deposited on tube 5. The copper axial end connections may be eliminated, and solder applied directly to the undercoat.

Physical masks for defining the various metal elements or electrodes are relatively thick, do not control the exact dimensions well and can not be made to produce extremely small detail. To obtain the most accuracy and best production results, the well known semiconductor masking and sputter deposition process is more desirable for applying the conductors 7 of the fuse to the outside of the inner electrical insulating tubing 51.

In the semi-conductor process, one outer side of the inner insulating tubing 51, approximately 180° around, is metallized with copper to a thickness suitable to form pads 15 first. The tube 51 is coated with a UV sensitive resist material, a mask made by photolithography is applied, UV light is used to expose the resist in the desired areas, unexposed resist is washed away, chemical etching removes all metallization not covered by developed resist, developed resist is removed by solvent and tube 51 is ready for the next metallization.

In the second step, a metal such as copper is deposited as in step one, to form the electrodes 9. The tube 51 is coated with UV sensitive resist material, a mask is applied to develop resist in the pad 15 area along with the electrode 9 area, UV light develops the resist, unexposed resist and metallization is etched away and the tube 51 now has pads 15 and electrodes 9 deposited and defined on its outer surface, with small gaps in the spot 10 area.

In the third step, metallization of a different metal, such as tin, is deposited on the outside of tube 51, as in the first step and covering pads 15 and electrodes 9. Tube 51 is again coated with UV sensitive resist, a mask is applied to develop resist in the spot 11 area, UV light develops the resist, unexposed resist is removed, exposed metallization is etched by a selective tin etch material and tube 51 is ready for the next step. At this time, tube 51 has the pads 15, electrodes 9 and spot 11 defined on its outer surface FIG. 3.

In the fourth step, metallization such as copper for the strap 13 is applied over the entire tube 51 upper surface as in the first step. UV sensitive resist is applied, a mask is applied to define the strap in the spot 11 area and leave it the same width as the electrode 9 and pad 15 in those areas, UV light develops resist, unexposed resist is removed, exposed metallization is etched away and the conductors are now all in place on tube 51.

The open area between electrode 9 is bridged physically and electrically by spot 11 and strap 13. Using a very narrow mask in the order of a few microns in this area, allows the formation of a fusible link that can be narrow and thick. The photolithographic masks can also define various lengths and cross sections for the fusible link not possible with metal masks of the type used inside the sputter metallization equipment of the preferred embodiment.

Because of the hermetic seal formed by the solder, sputtered end-metallization and glass, the small volume between the tubes may be closely controlled. In the soldering process of the preferred embodiment, the space is filled with the argon-hydrogen gas of the glove box. When the fuse is cooled to room temperature, the argon-hydrogen fill is at less than atmospheric pressure. Using reflow solder techniques, the space may be filled with other gases at other pressures.

Round tubular elements are preferred for their ease of manufacture to close tolerances and ease of fabrication. It will be understood, however, that many of the advantages of the present invention may be achieved with other configurations such as square tubing or even flat substrates carrying the fuse element with a flat cover sheet spaced from it.

These variations are merely illustrative.

We claim:

1. The method of forming a fuse comprising a step of metallizing a substrate to form a plurality of electrode elements bridged by fusible elements differing from the electrode elements in at least one of composition and cross-sectional area, a step of covering at least the fusible elements with a protective cover, and thereafter a step of severing the substrate to form a plurality of fuses from the substrate, each of the fuses including at least a part of the protective cover, the severing step producing end surfaces substantially perpendicular to the electrode elements, and a further step, after the severing step, of metallizing the end surfaces to from an electrical connection with the electrode elements.

2. The method of claim 1 wherein the substrate is a tube and wherein the first-mentioned metallizing step is performed on the outer surface of the tube to produce a metallized tube.

3. The method of claim 1 wherein the metallizing steps are performed by vacuum sputtering.

4. The method of claim 3 wherein the first-mentioned metallizing step includes a step of applying fusible elements, a step of applying electrodes, and a step of applying pads spaced from the fusible elements.

5. The method of claim 1 wherein the severing step comprises cutting through the electrode elements.

6. The method of claim 1 wherein, during the step of metallizing the end surfaces, the protective cover prevents further metallization of the fusible elements but permits metallization over a portion of the electrode elements.

7. The method of claim 1 including a further step of applying solder to at least one metallized end.

8. The method of claim 7 including a step of applying a lead to the at least one metallized and soldered end.

9. The method of claim 7 including a step of applying a lead extending across the at least one metallized and soldered end.

10. The method of claim 1 wherein the substrate is made of a glass having a softening point greater than 700° C.

11. A method of forming an electrical component comprising a step of metallizing a conductor on the outer surface of an insulative tube to produce a metallized tube, a further step of covering at least a part of the conductor with a protective cover, the protective cover comprising an outer tube, and thereafter a step of cutting through the metallized tube to form a plurality of components, each of the components including at least a part of the protective cover, the step of covering at least a part of the conductor comprising sleeving the metallized tube into the outer tube, and the cutting step comprising cutting through the outer tube and the metallized tube.

12. The method of claim 11 including a further step of metallizing axial ends of the cut tubes after the cutting step.

13. The method of claim 12 including a further step of sealing the axial ends of the cut tubes to form a sealed chamber between the inner tube and the outer tube.

14. The method of claim 12 including a further step of applying solder to the metallized ends of the tubes.

15. The method of claim 11 wherein the metallizing step is performed by vacuum sputtering.

16. The method of claim 15 wherein the metallizing step forms at least one metallized conductor extending axially of the metallized tube and including a further step of applying leads to axial ends of each component.

17. The method of claim 15 wherein the metallized tube is a glass tube having a softening point greater than 700° C.

18. The method of claim 11 including a step of encapsulating a plurality of the sleeved tubes in a matrix before the step of cutting the sleeved tubes.

19. A method of forming electrical components comprising metallizing at least one electrical conductor on the outer surface of a glass tube; sleeving said metallized glass tube in a second glass tube; cutting said sleeved tubes into individual electrical components including portions of both the first tube and the second tube; and forming electrical contact means across the ends of said components, said contact means making electrical contact with at least one said electrical conductor.

20. The method of claim 19 including a step of encapsulating a plurality of the sleeved tubes in a matrix before the step of cutting the sleeved tubes.

21. The method of claim 19 wherein said step of forming electrical contact means seals the axial ends of the components with an electrically conductive material.

22. A method of making a fuse comprising a first step of covering a dielectric substrate with at least one mask having openings therein and vacuum sputtering a plurality of conductor means onto the substrate through the openings in the at least one mask, each conductor means including a fusible link portion differing from the remainder of the conductor in at least one of composition and cross-sectional area, the mask preventing sputtering onto substantial portions of the substrate, and thereafter a second step of severing the substrate to form a plurality of fuses, each fuse including a conductor formed from said conductor means and each fuse including a said fusible line.

23. The method of claim 22 wherein the first step includes a step of sputtering link portions through a first mask and a step of sputtering electrode portions through a second mask.

* * * * *

UNITED STATES PATENT AND TRADEMARK OFFICE

CERTIFICATE OF CORRECTION

PATENT NO. : 5,040,284

DATED : August 20, 1991

INVENTOR(S) : Vaughan Morrill

It is certified that error appears in the above-indentified patent and that said Letters Patent is hereby corrected as shown below:

On the title page:Item [73] Assignee: is " Morrill Glasstek" should be -- Morrill Glasstek, Inc. --;

Col. 14, line 25, is "said fusible line" should be --said fusible link --.

Signed and Sealed this

Third Day of August, 1993

*Attest:*

Michael K. Kirk

MICHAEL K. KIRK

*Attesting Officer* — *Acting Commissioner of Patents and Trademarks*

UNITED STATES PATENT AND TRADEMARK OFFICE

CERTIFICATE OF CORRECTION

PATENT NO. : 5,040,284

DATED : August 20, 1991

INVENTOR(S) : Vaughan Morrill, Jr., John H. Scandrett and David K. Hudson

It is certified that error appears in the above-indentified patent and that said Letters Patent is hereby corrected as shown below:

Cover Page, first column, after "[*] Notice: The portion of the term of this patent subsequent to" cancel "Aug. 29, 2006" and insert therefor ---Jan. 22, 2007---.

Signed and Sealed this

Twenty-fifth Day of March, 1997

Attest:

BRUCE LEHMAN

Attesting Officer

*Commissioner of Patents and Trademarks*